March 16, 1971  B. C. ARNOLD  3,570,319
REVERSIBLE POWER TRANSMISSION

Filed Dec. 17, 1969  3 Sheets-Sheet 1

INVENTOR:
BRUCE C. ARNOLD
BY:
James E. Nilles
ATTORNEY

March 16, 1971     B. C. ARNOLD     3,570,319

REVERSIBLE POWER TRANSMISSION

Filed Dec. 17, 1969     3 Sheets-Sheet 2

INVENTOR:
BRUCE C. ARNOLD
BY: James E. Nilles
ATTORNEY

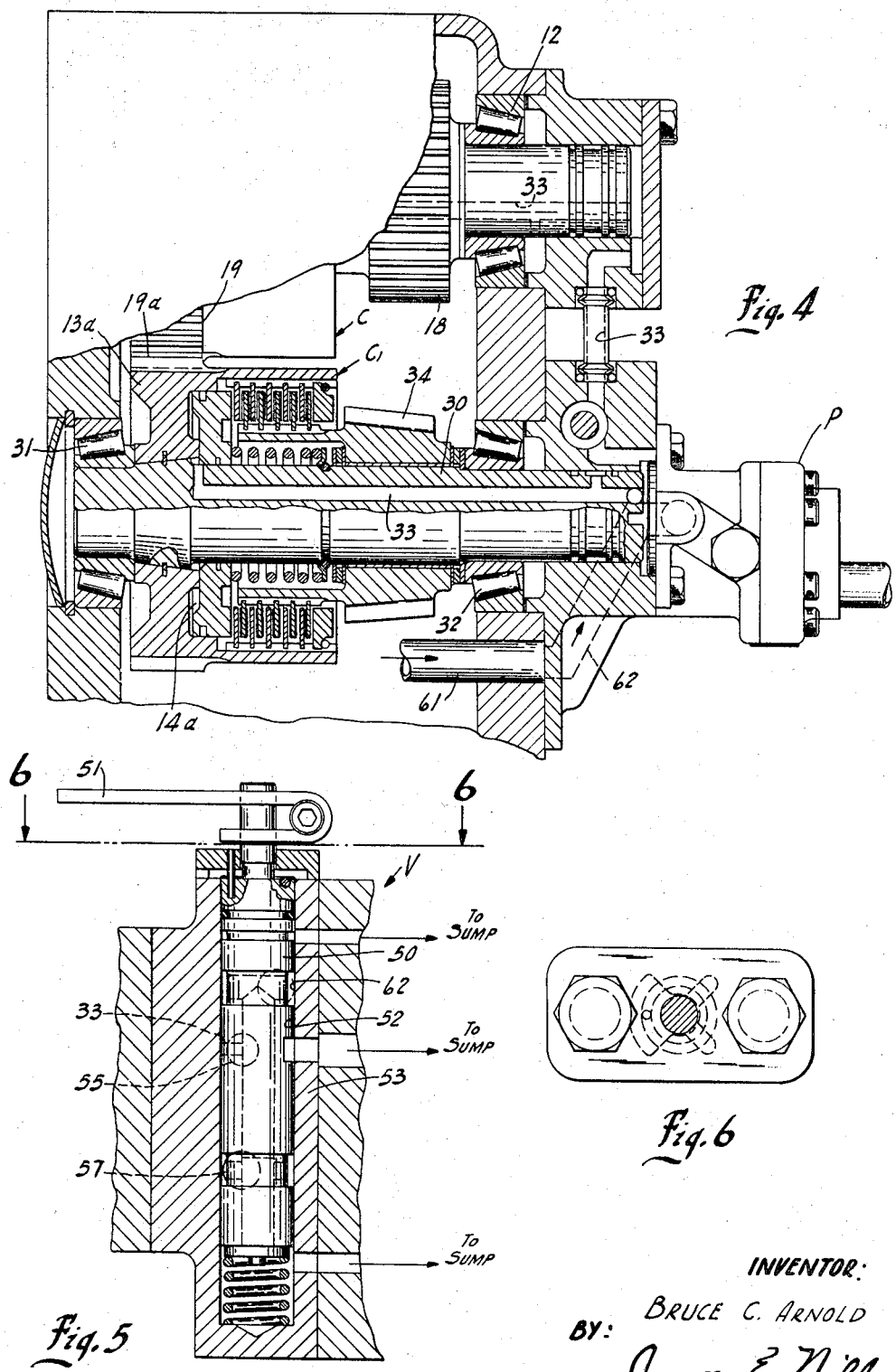

United States Patent Office 3,570,319
Patented Mar. 16, 1971

3,570,319
REVERSIBLE POWER TRANSMISSION
Bruce C. Arnold, Racine, Wis., assignor to Twin Disc Incorporated, Racine, Wis.
Filed Dec. 17, 1969, Ser. No. 885,860
Int. Cl. F16h 3/14, 1/12
U.S. Cl. 74—361
18 Claims

ABSTRACT OF THE DISCLOSURE

A power transmission for transmitting power from an input shaft and to an output shaft which is inclined at an angle to the input shaft, said transmission having means including a second shaft for driving the inclined output shaft in the reverse direction with equal power to that in which it is driven in the other direction. The transmission includes a clutch means for the input shaft and the second shaft and also includes meshing gears between the input, second and output shafts and which gears are in constant mesh with one another and selectively engaged by the clutches.

BACKGROUND OF THE INVENTION

This invention pertains to power transmissions which include gear combinations that are selected by hydraulically operated clutches, and find particular utility in marine gears for example, where the power output shaft is at an inclined angle to the power input and other shafts, the inclined power output shaft driving the propeller shaft of the boat, for example.

In these prior transmissions, it was difficult to be able to drive the inclined power output shaft in either direction with equal power. Furthermore, because of the inclination of the power output shaft, the other parts of the transmission, such as the power source, required considerable vertical height which contributed to a rather high over-all design of the boat or craft.

SUMMARY OF THE INVENTION

The present invention provides a power transmission having a power input shaft and a second shaft which is parallel to the input shaft, each of the shafts having a gear rotatable thereon and connectible with its respective shaft by means of a clutch carried by the shaft; the third power output shaft is inclined at an angle to the other two shafts and it has a tapered gear fixed thereto which is in constant mesh with the gears of the other two shafts. The arrangement is such that either of the clutches can be selectively engaged to provide driving power to the output shaft in one direction of rotation or the other.

A more specific aspect of the present invention relates to a transmission of the above type in which the gear that is located on the power input shaft is a straight, helical gear, the second shaft is located in an off-set relation to the power input shaft and the gear on this second shaft is of the tapered and helical type, the gear located on the inclined output shaft is then of the tapered type which is in constant mesh with the gears on the input and second shafts.

A more specific object of the present invention is to provide a transmission of the above type in which the clutch means are of the hydraulically actuated, friction plate type having a drum that is fixed to its respective shaft. The drum, in turn, has a toothed portion so that the drums are in constant mesh with one another and simultaneously driven to thereby simultaneously drive both the input and second shafts, the gears on the shafts being freely rotatable thereon so that they can be driven under power when their clutch is engaged to thereby effect a power transmission in the desired direction.

These and other objects and advantages of the present invention will appear hereinafter as this disclosure progresses, reference being had to the accompanying drawings.

BRIEF DESCRIPTION OF THE DRAWINGS

FIG. 4 is a cross sectional view taken along line 4—4 in FIG. 3;

FIG. 5 is an enlarged sectional view along line 5—5 in FIG. 3;

FIG. 6 is a sectional view taken along line 6—6 in FIG. 3, and

DESCRIPTION OF THE PREFERRED EMBODIMENT

Figures 1, 2:
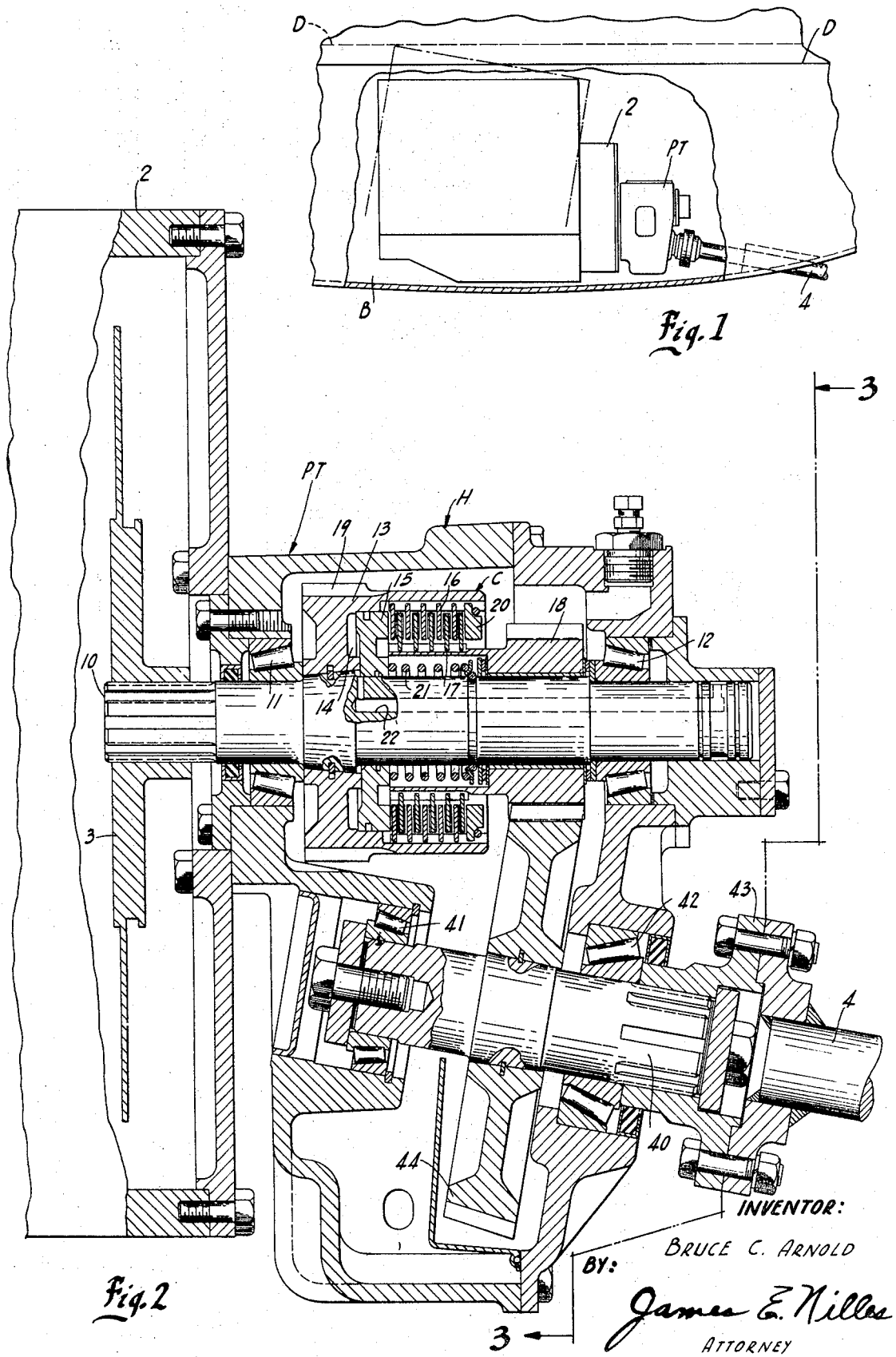
FIG. 1 is a schematic view showing the power transmission of the present invention as applied to a marine gear installation.
FIG. 2 is a longitudinal, cross sectional view through the power transmission shown in FIG. 1, but on an enlarged scale, certain parts being removed for the sake of clarity.
Figure 3:
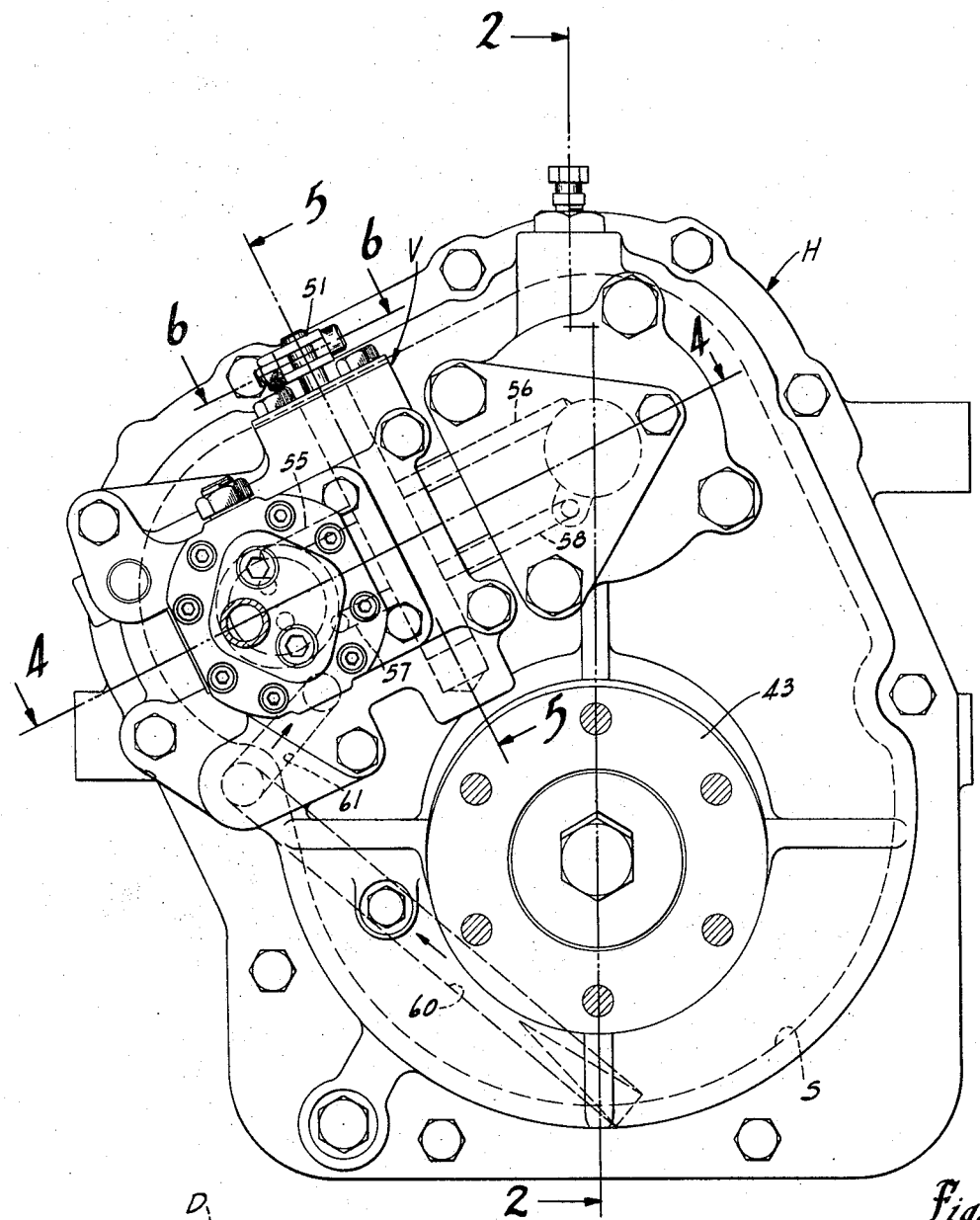
FIG. 3 is a rear elevational view of the transmission shown in FIG. 2, certain parts being shown as broken away for the sake of clarity.

FIG. 1 illustrates the power transmission of the present invention as used in a boat B which is shown fragmentarily and where it finds considerable utility. An internal combustion engine 1 delivers power to a flywheel 3 located in the flywheel housing 2, the flywheel in turn delivering power to the power transmision PT. Power is then delivered by the transmission to the propeller shaft 4, which shaft is inclined at an angle and extends downwardly to drive other associated parts, such as a propeller (not shown) of the boat.

With the present invention the deck D of the boat can be located in a lower, full line position, and a conventional power train and deck location being shown in dotted lines which requires additional vertical space.

The power transmission is shown in greater detail in FIG. 2 and includes a housing H in which the power input shaft 10 is rotatably journalled by the anti-friction bearing assemblies 11 and 12. A clutch means C is mounted on the shaft and this clutch means includes a drum 13 which is fixed to the shaft 10 for rotation therewith. The clutch means is of the hydraulically actuated, interleaved friction plate type and includes a clutch actuating chamber 14 which can be pressurized with fluid in the known manner to cause the piston 15 to extend and thereby clamp up the interleaved friction plates 16 and 17 which are fixed respectively to the interior of the drum 13 and to a gear 18. The gear is freely journalled on the shaft 10 and when the clutch means C is engaged due to clamping action of the piston, the gear 18 is then drivingly rotated. Gear 18 is of the straight, helical type, that is to say, it is of constant diameter along its length, but its teeth are of the helical type. The drum of the clutch includes a toothed portion 19 around its periphery for purposes that will appear shortly. The clutch also includes a back-up plate 20 fixed to the drum and a return spring 21 for positively disengaging the clutch when the pressure is removed from the actuating chamber 14. Pressure fluid is introduced into the clutch actuating chamber 14 via the passage means 22 which is formed by rifle drilling or the like in the shaft 10. This pressure fluid comes from a pressure source such as the fluid pump P which is located on the housing.

Referring particularly to FIG. 4, the transmission also includes a second shaft 30 which is journalled in the housing by means of the antifriction bearing assemblies 31 and 32. This shaft 30 has a clutch means C1 which is generally similar to the clutch means of shaft 10 and a detailed description of it is not believed to be necessary nor desirable. It is believed sufficient to say that pressure fluid is introduced to the clutch actuating chamber 14a of clutch means C1, via the fluid passages 33, 55 and 56. The gear 34 of clutch C1 is not only of the helical type, but is also of the tapered type, for a purpose that will hereinafter appear.

In this manner, clutch means C1 is connected between the second shaft and its gear 34 for disconnectibly transmitting power from the second shaft to the gear 34.

It will be noted that shafts 10 and 30 are arranged within the housing and in parallel relationship to one another. The drums 13 and 13a of clutch means C and C1, respectively, are in constant engagement with one another via their toothed portions 19 and 19a, respectively. Thus, the shafts 10 and 30 are simultaneously rotated, and the clutches C and C1 are selectively engaged to furnish power, respectively, through their gears 18 or 34, and to a third shaft now to be described.

The transmission also includes a third or output shaft 40 which is journalled in the housing by means of antifriction bearing means 41 and 42 and it will be noted that this shaft 40 is positioned at an incline to parallel shafts 10 and 30. The amount of inclination may vary, but has been shown in this particular installation as being on the order of approximately 10 degrees of the horizontal. The output shaft has a connecting flange 43 for attachment to the propeller shaft (FIG. 1). The output shaft has a relatively large, tapered gear 44 fixed thereto for rotation therewith and this tapered gear is in constant mesh with both gears 18 and 34. Inasmuch as shaft 34 is laterally off-set, it must not only be tapered, but also of helical toothed construction to be able to mesh with gear 44.

Depending on which clutch C or C1 is engaged to transmit power to its respective gear 18 or 34, the output shaft 40 will be driven in one direction or another. With the present arrangement, power can be transmitted to shaft 40 for either direction of rotation of shaft 40, and the full power to be transmitted to shaft 40 in the reverse as well as the forward directions of boat travel.

Control means are provided for selectively actuating each of the clutch means C or C1 and this control means has been shown as a control valve V. The valve includes a rotatable spool 50 which is turned by means of the lever 51, the spool rotating in its bore 52 of the valve housing 53. Fluid passages 55 and 56 in the valve housing are communicable with passages 22 and 33 of clutches C and C1, respectively, and by turning the spool to the appropriate position, either clutch passage can be placed in communication with the passages 33 and 62 leading to the pressure side of the pump P. The pump draws fluid from the sump S located at the lowermost portion of the housing, up through passages 60, 61 and 62 which communicates with the bore 52. Excess pump flow enters the lubrication circuit through passages 57 and 58.

Figure 7:
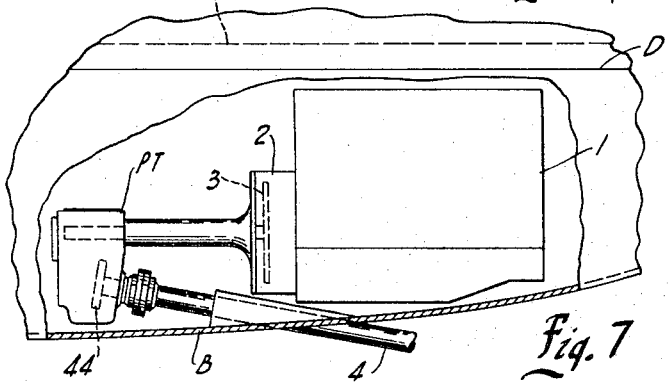
FIG. 7 shows a modified form of the invention for a V-drive, marine gear installation.

FIG. 7 illustrates the invention as applied to a V drive installation. In this embodiment, it will be noted that the opposite end of the shaft 10 of the power transmission is driven from the flywheel, and otherwise the power transmission is unchanged. With this particular installation, it will be noted that the angle of the output shaft allows the propeller shaft 4 to clear the engine crankshaft housing with little axial distance between the power transmission PT and the crankshaft housing. Thereby the present power transmission results in an axially compact V drive unit.

RESUME

The power transmission of the present invention can transmit power to an inclined power output shaft, driving the output shaft in either direction of rotation with equal amounts of power, the input and second shafts are parallel to one another and all three shafts have constant mesh gears for transmitting power between them.

The present invention finds particular utility in marine gear installations and substantially reduces the over-all height and over-all length required for the power train.

I claim:

1. A power transmission comprising, a housing, a power input shaft rotatably mounted in said housing, a gear rotatably mounted on said input shaft, and clutch means connected between said input shaft and said gear for disconnectibly transmitting power from said shaft to said gear, a second shaft rotatably mounted in said housing and parallel to said input shaft and having a gear rotatably mounted thereon, clutch means connected between said second shaft and its gear for disconnectibly transmitting power from said second shaft to its gear, means each having a toothed portion in constant mesh with one another for simultaneous rotation by said input shaft, a power output shaft rotatably mounted in said housing and being inclined to said input and second shafts, a gear fixed to said output shaft for constant mesh with said gears of said input and second shafts, whereby either of said input shaft or said second shaft may be drivingly connected with said output shaft through their respective gears.

2. A power transmission comprising, a housing having means for attachment to the flywheel housing of a power source, a power input shaft rotatably mounted in said housing for receiving power from said power source, a gear rotatably mounted on said input shaft, and fluid actuated clutch means connected between said input shaft and said gear for disconnectibly transmitting power from said shaft to said gear, a second shaft rotatably mounted in said housing and parallel to said input shaft and having a gear rotatably mounted thereon, fluid operated clutch means connected between said second shaft and its gear for disconnectibly transmitting power from said second shaft to its gear, means each having a toothed portion in constant mesh with one another for simultaneous rotation by said input shaft, a power output shaft rotatably mounted in said housing and being inclined to said input and second shafts, a gear fixed to said output shaft for constant mesh with said gears of said input and second shafts, whereby either of said input shaft or said second shaft may be drivingly connected with said output shaft through their respective gears.

3. The transmission set forth in claim 2 further characterized in that said gear on said output shaft is a tapered gear, and one of said other gears is of the tapered and helical type.

4. A marine gear power transmission comprising, a housing having means for attachment to the flywheel housing of a power source, a power input shaft rotatably mounted in said housing for receiving power from said power source, a gear rotatably mounted on said input shaft, and fluid actuated clutch means connected between said input shaft and said gear for disconnectibly transmitting power from said shaft to said gear; a second shaft rotatably mounted in said housing and parallel to said input shaft and having a gear rotatably mounted thereon, fluid operated clutch means connected between said second shaft and its gear for disconnectibly transmitting power from said second shaft to its gear, said clutch means each having a toothed portion fixed to its respective shaft, said gear portions being in constant mesh with one another for simultaneous rotation by said input shaft, a power output shaft rotatably mounted in said housing and being inclined to said input and second shafts, a tapered gear fixed to said output shaft for constant mesh with said gears of said input and second shafts, one of said gears of said input and second shafts being of the tapered and helical type, and control means for selectively actuating each said clutch means whereby either of said input shaft or said second shaft may be drivingly connected with said output shaft through their respective gears.

5. The transmission set forth in claim 1 further characterized in that each of said clutch means includes a drum fixed to its respective shaft, and said toothed portions are formed on their respective drums, whereby said drums are in constant engagement with one another and are simultaneously rotated.

6. The transmission set forth in claim 2 further characterized in that each of said clutch means includes a drum fixed to its respective shaft, and said toothed portions are formed on their respective drums, whereby said drums are in constant engagement with one another and are simultaneously rotated.

7. The transmission set forth in claim 3 further characterized in that each of said clutch means includes a drum fixed to its respective shaft, and said toothed portions are formed on their respective drums, whereby said drums are in constant engagement with one another and are simultaneously rotated.

8. The transmission set forth in claim 4 further characterized in that each of said clutch means includes a drum fixed to its respective shaft, and said toothed portions are formed on their respective drums, whereby said drums are in constant engagement with one another and are simultaneously rotated.

9. The transmission described in claim 5 further characterized in that said clutch means are of the interleaved friction plate type, some of said plates being attached to their respective drum and others of said plates being attached to their respective gears.

10. The transmission described in claim 6 further characterized in that said clutch means are of the interleaved friction plate type, some of said plates being attached to their respective drum and others of said plates being attached to their respective gears.

11. The transmission described in claim 7 further characterized in that said clutch means are of the interleaved friction plate type, some of said plates being attached to their respective drum and others of said plates being attached to their respective gears.

12. The transmission described in claim 8 further characterized in that said clutch means are of the interleaved friction plate type, some of said plates being attached to their respective drum and others of said plates being attached to their respective gears.

13. The transmission as claimed in claim 1 further characterized in that the gear on said power input shaft is of the straight helical pinion type, the gear on said second shaft is of the tapered and helical type, and the gear on said output shaft is of the tapered type.

14. The transmission as claimed in claim 2 further characterized in that the gear on said power input shaft is of the straight helical pinion type, the gear on said second shaft is of the tapered and helical type, and the gear on said output shaft is of the tapered type.

15. The transmission as claimed in claim 3 further characterized in that the gear on said power input shaft is of the straight helical pinion type, and the gear on said second shaft is of the tapered and helical type.

16. The transmission as claimed in claim 4 further characterized in that the gear on said power input shaft is of the straight helical pinion type, and the gear on said second shaft is of the tapered and helical type.

17. The transmission as claimed in claim 5 further characterized in that the gear on said power input shaft is of the straight helical pinion type, the gear on said second shaft is of the tapered and helical type, and the gear on said output shaft is of the tapered type.

18. The transmission as claimed in claim 9 further characterized in that the gear on said power input shaft is of the straight helical pinion type, the gear on said second shaft is of the tapered and helical type, and the gear on said output shaft is of the tapered type.

References Cited

UNITED STATES PATENTS

| | | | |
|---|---|---|---|
| 1,548,917 | 8/1925 | Vincent | 74—417X |
| 1,772,158 | 8/1930 | Prigg | 74—423X |
| 2,282,612 | 5/1942 | Shultz | 74—417X |
| 2,729,981 | 1/1956 | Badzien | 74—361 |
| 2,750,806 | 6/1956 | Hobbs | 74—417 |
| 2,851,895 | 9/1958 | Aschauer | 74—361 |
| 3,350,958 | 11/1967 | Casale | 74—417 |
| 3,439,787 | 4/1969 | Minciotti et al. | 74—361X |

FOREIGN PATENTS

| | | | |
|---|---|---|---|
| 945,588 | 1/1964 | Great Britain | 74—361 |
| 222,115 | 9/1942 | Switzerland | 74—417 |

CARLTON R. CROYLE, Primary Examiner

T. C. PERRY, Assistant Examiner

U.S. Cl. X.R.

74—416